United States Patent [19]

Haba

[11] Patent Number: 4,715,698

[45] Date of Patent: Dec. 29, 1987

[54] HEATER-EQUIPPED OUTER REARVIEW MIRROR

[75] Inventor: Shinji Haba, Aichi, Japan

[73] Assignee: Kabushiki Kaisha Tokai Rika Denki Seisakusho, Aichi, Japan

[21] Appl. No.: 939,718

[22] Filed: Dec. 9, 1986

[30] Foreign Application Priority Data

Dec. 9, 1985 [JP] Japan .............................. 60-190046[U]

[51] Int. Cl.⁴ ................................................. B60R 1/06
[52] U.S. Cl. ..................................... 350/588; 219/219
[58] Field of Search .................. 350/588, 582; 219/219

[56] References Cited

U.S. PATENT DOCUMENTS 3,597,586  8/1971  Rebovich ............................ 219/219
3,877,780  4/1975  Taylor .

FOREIGN PATENT DOCUMENTS 2222322 11/1973 Fed. Rep. of Germany ...... 350/588
2750581  5/1979 Fed. Rep. of Germany ...... 350/588
3040284  4/1982 Fed. Rep. of Germany ...... 350/588
3206526  9/1983 Fed. Rep. of Germany ...... 350/588

Primary Examiner—Jon W. Henry
Attorney, Agent, or Firm—Birch, Stewart, Kolasch, & Birch

[57] ABSTRACT

The present invention relates a heater-equipped outer rearview mirror having a flat heater positioned between a mirror and a mirror holder. The flat heater has a terminal fixing portion which protrudes from a back face thereof and is connected to terminals of lead wires. The mirror holder includes a box, which is provided at the back face thereof so as to accommodate the terminal fixing portion, a hole, which penetrates therethrough to permit lead wires connected to the terminals at one end and to a connector at the other end to pass therethrough from the front face of the mirror holder toward the back face thereof, and a connector holding portion which protrudes from the back face of the mirror holder so as to hold the connector therein. With the above construction, the holding of the connector is effected by merely inserting the connector into the connector holding portion of the mirror holder. Therefore, the secure mounting of the connector in the mirror case is ensured.

3 Claims, 5 Drawing Figures

HEATER-EQUIPPED OUTER REARVIEW MIRROR

BACKGROUND OF THE INVENTION

1. Field of the Invention

The present invention generally relates to an outer rearview mirror such as a door mirror and a fender mirror for an automobile. More particularly, the present invention relates to a heater attached outer rearview mirror which has, in a mirror case thereof, a connector for connecting the heater to a lead wires extending from a power supply.

2. Description of the Prior Art

Conventionally, there exists a heater equipped outer rearview mirror, as shown in FIG. 5, which has a connector 5 connected through lead wires 4 to a flat heater 3 interposed between a mirror 1 and a mirror holder 2. The connector 5 is normally fitted in a connector holding portion, namely, a housing 7 attached to an inner face of a mirror case 6. A plate 8 is fixed to an opening of the housing 7 by fastening a screw 9 thereto. Thus, the connector 5 is held in the housing 7.

The above-described connector holding construction has the disadvantages that screwing the plate 8 to the housing necessitates much labor because the housing 7 is located back from the plate 8 in the mirror case and that such a screw fastening work is costly because many attaching parts such as the plate 8 and the screw 9 are necessary for attaching the connector 5 to the housing.

There is also known in the art another outer rearview mirror with no connector holding portion. In this outer rearview mirror, a connector is placed in a mirror case using no screw to attach the connector to the mirror case. This construction has the disadvantage that the wind pressure applied to the outer rearview mirror and the vibration of a running automobile cause the connector and lead wire to generate vibration and noise, which in turn, causes the generation of mirror vibration.

There exists still another outer rearview mirror construction known in the art in which a cushion member is placed on the periphery of the outer face of the connector in order to prevent a possible interference, between the connector and members mounted on the periphery of the connector, caused by the vibration of the connector. However, the use of the cushion member necessitates much labor, hence high cost.

SUMMARY OF THE INVENTION

It is, therefore, an object of the present invention to provide a heater equipped outer rearview mirror which includes a connector to be connected to a flat heater element and is securely held in a mirror case without using other attaching members such as screws so that noise caused by the vibration of the connector can be prevented and the cost for mounting the connector attached to the mirror case can be reduced.

In accomplishing these and other objects, according to the present invention, there is provided an outer rearview mirror of the above type wherein the flat heater has a terminal fixing portion which protrudes from a back face thereof and is connected to terminals of wires and the mirror holder comprises a box, which is provided at the back face thereof so as to accommodate said terminal fixing portion, a hole, which penetrates therethrough to permit the wires and the connector to pass therethrough from the front face of said mirror holder toward the back face thereof, and a connector holding portion which protrudes from the back face of the mirror holder so as to hold said connector therein.

According to the above construction, the holding of the connector is effected by merely inserting it into the connector holding portion of the mirror holder. Therefore, the secure mounting of the connector is ensured. Therefore, no parts such as screws are necessary for mounting the connector to the mirror holder. In addition to this advantage, since the connector is fitted in the mirror holder so as to be held therein, noise generation and mirror vibration can be prevented. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
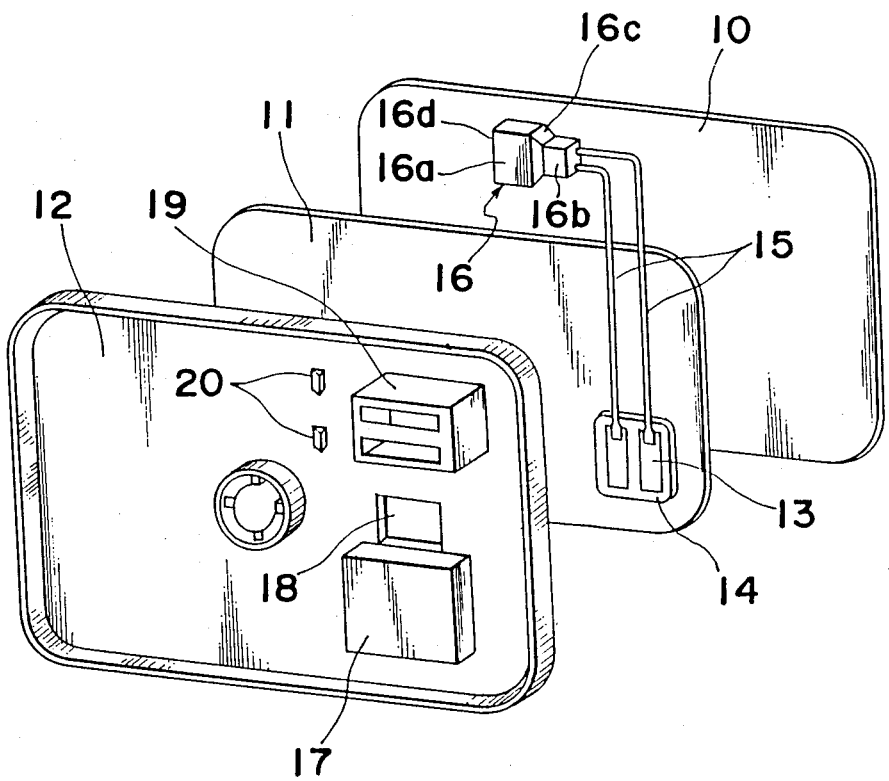
FIG. 1 is a perspective exploded view of a mirror, a flat heater, and a mirror holder composing an outer rearview mirror according to a preferred embodiment of the present invention.

Before the description of the present invention proceeds, it is to be noted that like parts are designated by like reference numerals and symbols throughout the several views of the accompanying drawings.

Referring to FIGS. 1 to 4 there is shown an outer rearview mirror according to a preferred embodiment of the present invention.

Figure 2:
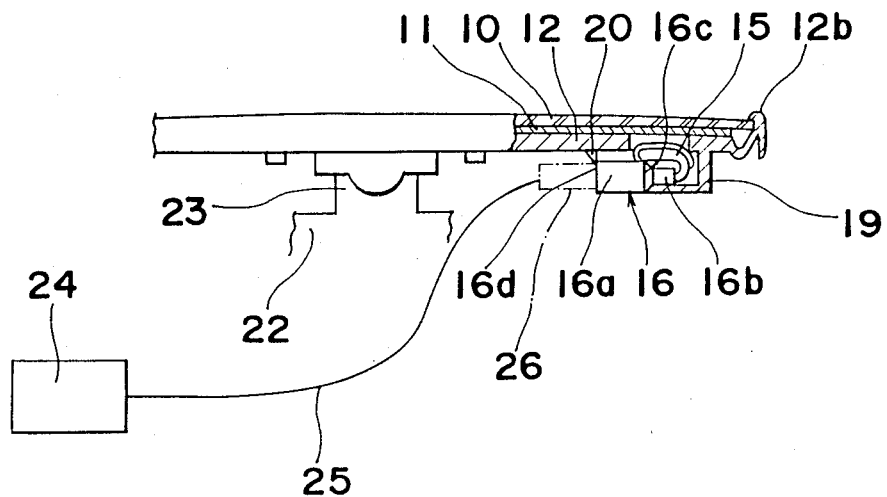
FIG. 2 is a partial sectional view of the outer rearview mirror in which the mirror, the flat heater, and the mirror holder shown in FIG. 1 are assembled.
Figure 3:
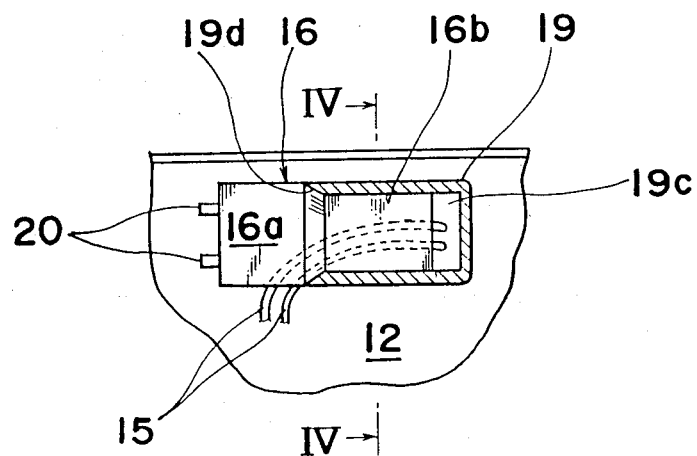
FIG. 3 is a partial rear elevational view in which a connector is fitted in a connector holding portion projecting from the mirror holder.

In the drawings, numeral 10 depicts a mirror for back and side views. Numeral 11 depicts a flat heater to be fixed to the mirror 10 with adhesive applied to the entire back face for the mirror 10. Numeral 12 depicts a mirror holder for holding the mirror 10 provided with the heater 11. As shown in FIG. 2, the mirror 10 is fitted in a front flat chamber of the mirror holder 12 and the periphery of the mirror 10 is engaged with hook portion 12b of the mirror holder 12 so as to sandwich the flat heater 11 between the mirror 10 and the mirror holder 12.

As shown in FIG. 1, the flat heater 11 has a terminal fixing portion 14 on which a pair of terminals 13 are mounted. The fixing portion 14 protrudes from the back face of the heater 11. A pair of lead wires 15 are connected, at one end, to one of the corresponding terminals 13. The other end of each lead wire 15 is connected to a connector 16. The connector 16 comprises a large portion 16a, a small portion 16b and a intermediate portion 16c connecting the small and large portions 16a and 16b. The lead wires 15 are connected to an end face of the small portion 16b.

Figure 4:
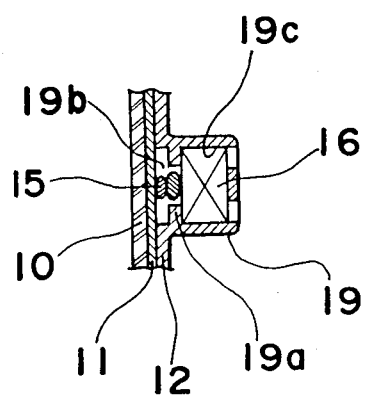
FIG. 4 is a sectional view taken on line IV—IV in FIG. 3.

As shown in FIGS. 1 and 2, the mirror holder 12 is provided with a box 17 for accommodating the terminal fixing portion 14 therein. The box 17 is integral with the mirror holder 12 and located at such a position as to face the terminal fixing portion 14 in such a manner that the box 17 protrudes, rearwardly, from the back face of the mirror holder 12. The mirror holder 12 is also provided with a hole 18, at a position above the box 17. The hole 18 is large enough to permit the lead wires 15 and the connector 16 to pass therethrough in the direction from the front toward the back. Further, there is provided, above the hole 18, a connector holding portion 19 which protrudes backwardly from the rear face of the mirror holder 12 and is open at the left face as shown in FIGS. 1 and 2. As shown in FIG. 4, the front wall of the connector holding portion 19 has a cut-out 19a to form a chamber 19b through which the lead wires 15 can pass. A chamber 19c of connector holding portion 19 is so configured as to precisely fit the smaller portion 16b of the connector 16 therein. An open end of the chamber 19c tapers to fit the intermediate portion 16c of the connector 16. A pair of upper and lower stoppers 20 protrude, at a portion adjacent to the opening of the connector holding portion 19. The stoppers 20 abut the end face 16d of the large portion 16a of the connector 16 which protrudes from the opening of the connector holding portion 19 when the connector 16 is fitted in the connector holding portion 19, whereby the connector 16 is securely held by the mirror holder 12. The large portion 16a of the connector 16 is intended to be connected to another connector 26 which is connected to the corresponding ends of lead wires 25 connected to power supply 24.

According to the above-described construction, when the mirror 10 with the heater 11 are fitted in the mirror holder 12, first, the terminal fixing portion 14 formed on the flat heater 11 is fitted in the terminal fit-in box 17 formed on the mirror holder 12, and then, the lead wires 15 connected to the terminal fixing portion 14 and the connector 16 are passed through the hole 18. Thereafter, the smaller portion 16b of the connector 16 is inserted into the connector holding portion 19 from the opening at the left side thereof in FIGS. 1 and 2. The end face 16d of the large portion 16a of the connector 16 is held by the stoppers 20. Thus, the connector 16 is held at the back face of the mirror holder 12 with the mirror 10, the flat heater 11, and the mirror holder 12 incorporated into a single unit.

Figure 5:
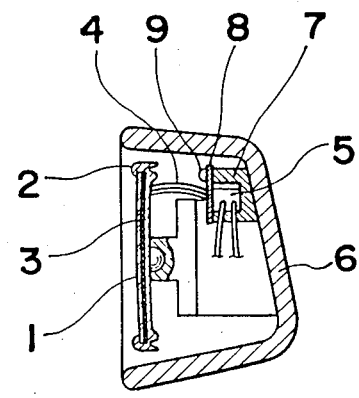
FIG. 5 is a sectional view showing a prior art construction of a heater-equipped outer rearview mirror, as already described above.

In addition, the mirror holder 12 provided with the mirror 10 and the flat heater 11 is pivotally connected, at its pivot 23, to a holding member 22 which is to be fixed to the mirror case in the same manner as in the case of the conventional construction shown in FIG. 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heater-equipped outer rearview mirror comprising:

a mirror;

a mirror holder for holding said mirror;

a flat heater interposed between said mirror and said mirror holder;

a connector; and lead wires connecting said heater to said connector, sait flat heater having a terminal fixing portion which protrudes from a back face thereof and is connected to terminals of said lead wires, said mirror holder including a box, which is provided at the back face thereof so as to accomodate said terminal fixing portion, a hole, which penetrates therethrough to permit said lead wires and said connector to pass therethrough from the front face of said mirror holder toward the back face thereof, and a connector holding portion which protrudes from the back face of said mirror holder so as to hold said connector therein.

2. The heater-equipped outer rearview mirror according to claim 1, wherein said connector holding portion is box-shaped and is provided with an opening for fitting the connector therein.

3. The heater-equipped outer rearview mirror according to claim 2, wherein said mirror holder is provided with stoppers at a position adjacent to said opening of said connector holding portion, a half portion of said connector is fitted in said connector holding portion and a remaining half portion of said connector protrudes from said opening of said connector holding portion with said remaining half portion being held by said stoppers.

* * * * *